United States Patent [19]

Durinovic-Johri et al.

[11] Patent Number: 5,699,514

[45] Date of Patent: *Dec. 16, 1997

[54] ACCESS CONTROL SYSTEM WITH LOCKOUT

[75] Inventors: Sanja Durinovic-Johri, Aberdeen; Patricia E. Wirth, Old Bridge, both of N.J.

[73] Assignee: Lucent Technologies Inc., Murray Hill, N.J.

[*] Notice: The term of this patent shall not extend beyond the expiration date of Pat. No. 5,495,235.

[21] Appl. No.: 578,286

[22] Filed: Dec. 26, 1995

[51] Int. Cl.$^6$ .................................................. G06F 11/00
[52] U.S. Cl. ............... 395/188.01; 395/186; 340/825.31; 340/825.32; 380/23
[58] Field of Search .................. 395/188.01, 187.01, 395/186; 340/825.31, 825.32; 380/4, 23, 25

[56] References Cited

U.S. PATENT DOCUMENTS

| | | | |
|---|---|---|---|
| 3,953,769 | 4/1976 | Sopko | 361/172 |
| 4,684,945 | 8/1987 | Sanderford, Jr. | 340/825.56 |
| 4,761,808 | 8/1988 | Howard | 329/95 |
| 4,847,614 | 7/1989 | Keller | 340/825.56 |
| 4,962,449 | 10/1990 | Schlesinger | 395/186 |
| 5,091,939 | 2/1992 | Cole | 380/25 |
| 5,226,080 | 7/1993 | Cole | 380/25 |
| 5,495,235 | 2/1996 | Durinovic-Johri | 340/825.31 |

*Primary Examiner*—Robert W. Beausoliel, Jr.
*Assistant Examiner*—Dieu-Minh Le
*Attorney, Agent, or Firm*—Thomas A. Restaino

[57] ABSTRACT

An access control system stores two codes for each user that is authorized to access a resource, a primary code and a secondary code. When a user desiring access inputs the primary code to the system, the code is compared with the stored code for that user. If the primary code is valid, the user is allowed to access the resource. However, if the primary code is entered incorrectly, a count of the number of invalid attempts for that user is incremented, and if the count does not exceed a first threshold, the user can try again. When the number of invalid access attempts for the user exceeds the first threshold, the system requires the user to correctly input both the primary and secondary codes, before access to the resource is allowed. A second count is also maintained of the number of failed attempts in providing both codes. When the number of failed attempts exceeds a second threshold, the user is "locked out", i.e, prevented, from gaining access to the resource for a specified period of time, even if the correct primary and secondary codes are entered during that period. The arrangement is more convenient than using a single, longer code in a conventional access control system with lock out, because, most of the time, a user only needs the primary code to access the resource. However, even if the first threshold is exceeded, an authorized user can still get access to the resource by correctly inputting both codes. The dual code system reduces the inconvenience caused by authorized users being locked out while also increasing security.

10 Claims, 3 Drawing Sheets

| USER ID | PRIMARY CODE | SECONDARY CODE | TIME STAMP | COUNT_1 | COUNT_2 | SYSTEM STATE |
|---|---|---|---|---|---|---|
| 001 | 123...8 | 1234 | DATE & TIME | 1 | 0 | PRIMARY |
| 100 | 824...1 | 4321 | DATE & TIME | 3 | 21 | EXTENDED |
| 100 | 721...3 | 8901 | DATE & TIME | 3 | 21 | EXTENDED |
| 451 | 5454...5 | 1901 | DATE & TIME | 3 | 101 | LOCKOUT |
| 575 | 6943...1 | 89710 | --- | 0 | 0 | PRIMARY |
| ⋮ | ⋮ | ⋮ | ⋮ | ⋮ | ⋮ | ⋮ |

ACCESS CONTROL SYSTEM WITH LOCKOUT

FIELD OF THE INVENTION

The present invention relates generally to an access control system in which a user is required to present a valid password before access to a resource may be obtained, and, in particular, to such a system in which the user is "locked-out" i.e., prevented from gaining access to the resource, if access is attempted using an invalid password.

BACKGROUND OF THE INVENTION

Access to various information movement and management (IM&M) resources, such as a telecommunications network, as well as to computer and banking facilities and information databases, is routinely obtained by users who can present evidence of permission to use the resource, in the form of a password, a Personal Identification Number (PIN), or another form of authorization code. The sophistication of access control systems has increased considerably and will continue to do so, as more and more features are added to the resources, and the value of the resources becomes greater. Entities that provide the resources want to have more control over the access process, want the security level to be high, and yet also want the access process to be "user friendly". However, "ease of use" generally translates to a certain lessening of security, and undesirably increases the possibility of unauthorized access as well as potential losses when security is breached. So far, by and large, the resource providers have absorbed the cost of "fraud" losses. Recently, some responsibility is being passed on to users such as large corporations that desire that their employees or customers have access to a resource. Unauthorized access presents a sizable problem that will only grow in the future. As losses due to hackers and other fraudulent users mount, and authorized users assume some liability for the losses, the demand for additional security will also grow.

The first step in preventing unauthorized access to resources and in protecting against fraud is to assign an authorization code, password or PIN to each authorized user, typically a code word of sufficient length so that a fraudulent user (also called a hacker) trying to break the code by multiple trial and error attempts using various possible combinations of the code will find it very difficult to gain access. This is because wrong combinations result in failed attempts and cause the access control system to "reset", so that the hacker has to "start again from the beginning." The time required to repeat the access process may be lengthy, and can even be intentionally increased to enhance security. See co-pending application Ser. No. 07/891,347 filed by McNair entitled "Access Control System" and assigned to the same assignee.

The second step in access control and fraud prevention is to limit the number of failed attempts allowed for a particular user. (Note here and in the following discussion, that an "authorized user" may be an entity consisting of numerous individuals each of whom desirably can gain access to the resource. In this event, a single "authorized user" will have numerous authorization codes.) This is usually accomplished by a mechanism known as "lock-out", that maintains a record of the number of failed access attempts by a particular user and compares it with an established threshold. If the threshold is reached, the access control system blocks all subsequent access attempts originated by that user for a prespecified time, or until some action occurs to clear the record for that user. Typically, when each subsequent attempt is blocked, an announcement is made that the authorization code entered is invalid, even if a valid code is actually entered, so that trial and error guess work is not rewarded.

When a lock-out system is used, the appropriate degree of security against unauthorized access is obtained by having a sufficiently long authorization code and a sufficiently low threshold. A longer authorization code increases security, because the code is harder to guess, but forces the user to remember and accurately enter the longer code. A smaller threshold on the number of failed attempts also increases security because hackers are blocked more frequently, but comes with the possibility that a "valid" or authorized user may get locked out if the threshold is tripped due to inadvertent mistakes or simple memory lapses. In some cases, where failed attempts for several individuals (such as employees of the same company who are considered as a single user, or family members who share the same password, or individuals using telephone equipment with the same automatic number identification (ANI)) are accumulated, the threshold can be exceeded even before a particular individual attempts access. In most access systems that implement the lock-out feature, the record of failed attempts is refreshed periodically, typically after a certain time period without any failed attempts. A longer time period for refreshing increases security, but it also increases the risk of locking out authorized users, which can create bad publicity by giving the impression that the system is not providing good service.

Accordingly, it would be desirable to improve security in an access control system of the type that provides for lockout after a predetermined number of failed access attempts, while retaining a high degree of user friendliness.

SUMMARY OF THE INVENTION

In accordance with the present invention, an access control system is arranged to store two codes for each user that is authorized to access a resource, namely a primary code and a secondary code. The primary code is preferably much shorter (and therefore simpler) than the code assigned to a user in a conventional, single code system. The primary plus secondary codes (together referred to as an "extended code") are typically slightly longer than the code in the single code scheme.

When the system is in its "primary state" and a user inputs the primary code to the system, the code is compared with the stored code for that user. Under normal circumstances, the primary code is recognized as valid, and the system then allows the user to gain access to the resource. If the primary code is entered incorrectly, a first count "count_1" of the number of invalid attempts for that user is incremented, and if the count does not exceed a first (generally small) threshold value $C_1$, the user is invited to try again. However, once the number (count_1) of invalid access attempts for the user exceeds the first threshold $C_1$, the access control system advances to its "extended state" and requires the user to correctly input both the primary and secondary codes, (i.e., the extended code) before access to the resource is allowed. A second count "count_2" is also maintained of the number of failed attempts in providing the extended code. When the number of failed attempts using the extended code exceeds the second (generally large) threshold $C_2$, the system advances to the "lockout state" in which the user is "locked out", i.e, prevented, from gaining access to the resource for a specified lockout time period $T_L$, even if the correct extended code is entered during that period.

The system resets the failed attempt counts (count_1 and count_2) and controls the system state, illustratively by keeping track of the time difference between the time at which access is requested and the time at which the last unsuccessful access attempt occurred. When the difference exceeds a first, generally large, refresh time $T_1$, both counts are reset and the system is restarted in its primary state. When the system is in the extended state and the time difference exceeds a second, generally small refresh time $T_2$, count_2 is reset. Also, if the system is in the lockout state, and the lockout time has expired at the time of the next access attempt, the system is advantageously reset to the extended state, with count_2 also being reset.

The arrangement of the present invention is more convenient than using a single, longer code in a conventional single code access control system with lock out. This is because, most of the time, a user only needs the shorter primary code to access the resource. However, if the first threshold is exceeded, an authorized user can still get access to the resource by using the extended code. This is only slightly less convenient than using the slightly smaller code in the single code scheme. The dual code system virtually eliminates the major inconvenience caused by authorized users being locked out, and simultaneously increases security.

BRIEF DESCRIPTION OF THE DRAWING

The present invention will be more fully understood by consideration of the following detailed description, which should be read in light of the accompanying drawing in which.

DETAILED DESCRIPTION

Figure 1:
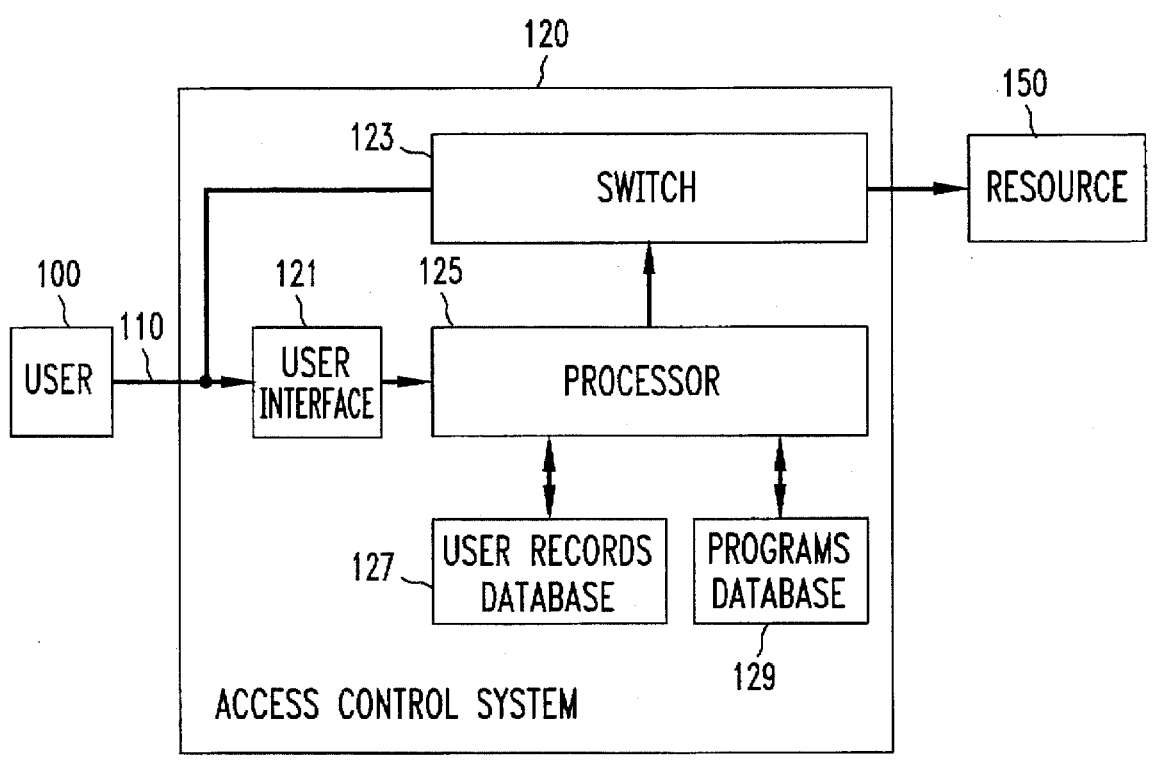
FIG. 1 is a block diagram of an access control system with lockout, arranged in accordance with the principles of the present invention.

Referring first to FIG. 1, there is shown a block diagram of an access control system with lockout, arranged in accordance with the principles of the present invention. A user 100 desiring to gain access to a resource 150 communicates and interacts with an access control system, 120 via a communications line 110. System 120 includes a user interface 121 arranged to receive inputs from user 100, which may be in the form of touch-tone signals (also known as dual tone multi frequency—DTMF signals) speech signals, or the like, and converts such inputs to electrical signals that are applied to and processed by processor 125. User interface 121 may be part of an audio response unit, such as the Conversant voice response unit (VRU) available from AT&T, and be also arranged to play voice announcements or prompts to user 100.

Figure 2:
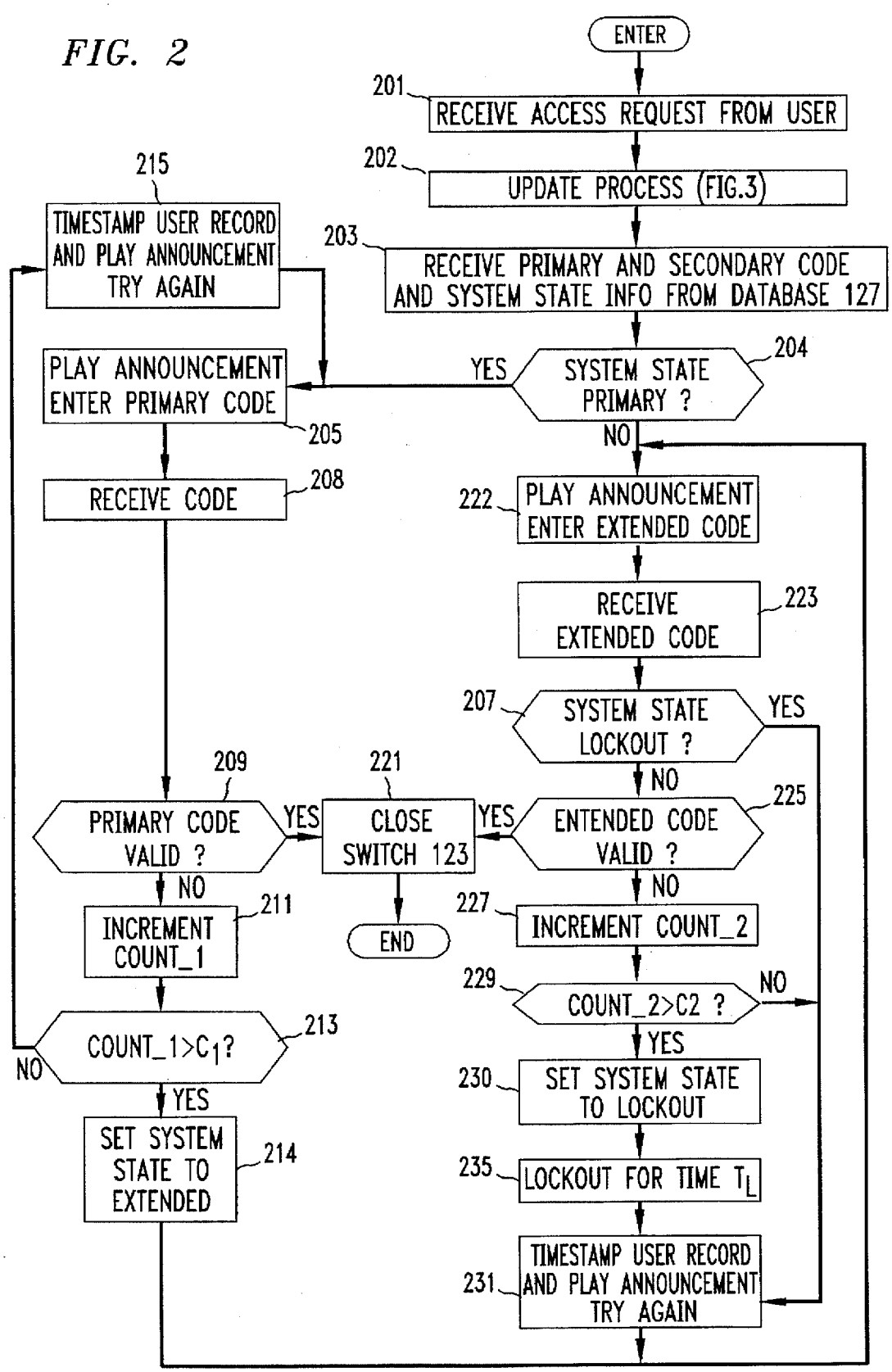
FIG. 2 is a flow diagram illustrating the steps performed by processor 125 in allowing user 100 to access resource 150 of FIG. 1.
Figures 3, 4:
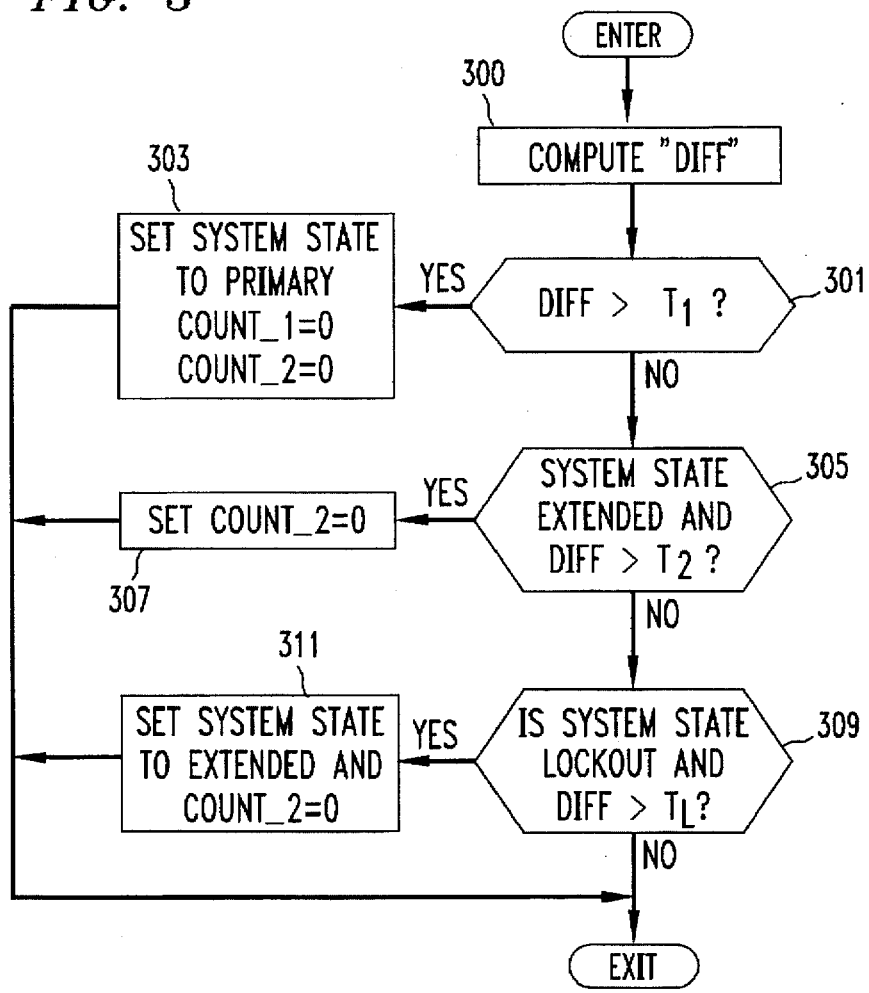
FIG. 3 is a flow diagram illustrating one way of performing step 202 of FIG. 2.
FIG. 4 illustrates the format of and information contained in a typical record stored in database 127 of FIG. 1.

Processor 125, which may be a stand alone microprocessor or microcomputer, or a part of the Conversant VRU described above, operates under control of program instructions stored in a first database 129. Processor 125 can retrieve stored information in a second database 127, which contains access codes and other information relating to user 100 and other users who may desire to access resource 150 through system 120. The functions performed by an illustrative control program stored in database 129 are illustrated in FIG. 2, while the organization of information records typically stored in database 127 is illustrated in FIG. 4. An output from processor 125 controls the operation of a switch 123, so that user 100 is connected to resource 150 when switch 123 is "closed" and blocked from access when switch 123 is "open". The functions of switch 123 are "logical" functions that are easily programmed into a Conversant VRU.

Referring now to FIG. 2, there is shown a flow diagram of the control program stored in database 129 that may be used to control the operation of processor 125 of FIG. 1. The process begins in step 201, when user interface 121 receives a request from user 100 to access resource 150. Such a request includes information identifying the particular user making the request. This can be a name, social security or account number, a login identification, or other information such as a speech sample that identifies that user.

In response to the access request received in step 201, an update process is performed in step 202 in order to determine if counts count_1 and/or count_2 should be reset, and to control the system state, based upon the time difference between the current time and the time at which the last failed access attempt occurred. Details of the update process are described below in connection with FIG. 3. Next, the information received in step 201 is applied via interface 121 to processor 125, to enable retrieval from database 127 of the previously stored primary and secondary access codes and system state information that are associated with the particular user requesting access. The primary and secondary codes are used for validation in steps 209 and 225. Generally speaking, system state information indicates, for a particular user requesting access, information regarding previous access attempts. Three states are defined: primary, extended and lockout. In the primary state, the particular user requesting access has not made more than a first number $C_1$ of invalid access attempts in a first time period $T_1$. At this point, this user can gain access using only the primary code. In the extended state, the particular user requesting access has exceeded the first threshold $C_1$ by making more than $C_1$ invalid access attempts during period $T_1$. However, this particular user has not made more than a second number $C_2$ of invalid access attempts in a second time period $T_2$. At this point, the user can gain access using both the primary and secondary access codes. In the lockout state, the particular user requesting access has exceeded the second threshold $C_2$ by making more than $C_2$ invalid access attempts during period $T_2$. At this point, this user cannot gain access to the resource, even if the extended (primary and secondary access codes) are correctly input. The system then remains in the lockout state for a lockout time period $T_L$. The system state information is used in decision steps 204 and 207, as described below.

If it is determined in step 204 that the system is in the primary state with respect to the particular user requesting access, then, in step 205, that user is requested to enter his/her primary code by an announcement played under the control of processor 125. As stated previously, entry may be by touch-tone keys, computer keyboard, or other similar means. The information entered is reformatted or converted as necessary by interface 121 and applied to processor 125 for use in succeeding steps in the process.

After the primary code is received by processor 125 in step 208, a determination is made in step 209 as to whether the primary code entered by the particular user seeking access is valid, i.e, does it match the code retrieved in step 203. If a positive result is obtained in step 209, access to the resource is granted by performing step 221, in which a signal is extended from processor 125 to switch 123, causing that switch to "close". If a negative result is obtained, the particular user seeking access may be given additional chances to obtain access.

In step 211, a first variable, labeled "count_1", representing a count of unsuccessful access attempts by the particular user seeking access using the primary code, is incremented. Now, in step 213, a determination is made as to whether the value "count-1" is greater than a first threshold value $C_1$. If a negative result is obtained in step 213, the particular user is permitted to again try to obtain access to resource 150 using only the primary code. This is accomplished by playing an announcement in step 215, requesting that the user try again, and by then repeating steps 205, 208 and 209, followed by step 221 or steps 211 and 213. When step 215 is performed, the timestamp information in the user's record is updated with the current time, thus storing the current time as the time of the last failed access attempt.

If it is determined in step 213 that the value of "count_1" is greater than the first threshold value $C_1$, the system is advanced to the "extended" state in step 214. Next, a different announcement is played to the particular user seeking access in step 222. This announcement requests the user to attempt to gain access to the resource by entering his/her extended code, consisting of both the primary and secondary codes. The code is then received in step 223. As long as it is determined in step 207 that the system is not in the "lockout" state, a determination is next made in step 225 as to whether the extended code entered by the particular user seeking access is valid, i.e., does it match the extended code retrieved in step 203. If a positive result is obtained in step 225, access to the resource is granted by performing step 221, in which a signal is extended from processor 125 to switch 123, causing that switch to "close". If a negative result is obtained, the particular user access may again be given additional chances to obtain access.

In step 227, a second variable, labeled "count_2", representing a count of unsuccessful access attempts by the particular user seeking access using the extended code, is incremented. Now, in step 229, a determination is made as to whether the value "count_2" is greater than a second threshold value $C_2$. If a negative result is obtained in step 229, the particular user is permitted to again try to obtain access to resource 150 using the extended code. This is accomplished by playing an announcement in step 231, requesting that the user try again, and by then repeating steps 222, 223, 207 and 225, followed by step 221 or by steps 227 and 229. When step 231 is performed, the timestamp information in the user's record is updated with the current time, thus storing the current time as the time of the last failed access attempt. If the second variable "count_2" does exceed the second threshold value $C_2$, the system is advanced to the "lockout" state in step 230, and the user is "locked out" of the resource for a predetermined time period $T_L$ in step 235. Information indicative of the fact that a particular user is in the lockout state is stored in the record for that particular user, and is available when step 207 is performed. The user requesting access is then placed in a loop, such that access to resource 150 is prevented even if a valid extended code is received by the system. This occurs by next playing an announcement, in step 231, requesting the user to try again, followed by an announcement in step 222, requesting that the extended code be entered. After the extended code is received in step 223, a positive result will ensue in step 207, since the system is now in the lockout state. Thus, the user requesting access now again receives the announcement of step 231, requesting that he try again. However, the announcement of step 222 is played, advising the user to enter the extended code. After the code is received in step 223, a positive result is obtained in step 207, because the system is now in the lockout state. When this occurs, the user requesting access again hears the announcement of step 231, requesting that he try again. This announcement occurs independent of the access code entered by the user, since step 225 is not performed. Thus, a locked out user has no way to access resource 150 during the lockout time period $T_L$, even if a valid code is entered (by guesswork) during this period. If the same user discontinues the process, and later requests access during the lockout time period $T_L$, a negative result is obtained in step 204, a positive result is obtained in step 207, the system does not check code validity in steps 209 or 225, and the user is unable to gain access to resource 150.

Details of the update process performed in step 202 in order to determine if counts count_1 and/or count$_{13}$ 2 should be reset, and to control the system state, based upon the time difference between the current time and the time at which the last failed access attempt occurred, are illustrated in FIG. 3. Before describing the steps in this process, it is to be noted that the record maintained in database 127 for each user contains information indicating the time of the last failed access attempt for that user. (A typical record is shown in FIG. 4, discussed below.)

When the process of FIG. 3 begins in step 300, processor 125 compares the present time to the stored time for a particular user to compute the value of a variable "DIFF", which represents the time that has elapsed since the last failed access attempt by this user. Next, in step 301, the value of DIFF is compared to a first time period, $T_1$. If the value of DIFF is greater than $T_1$, then a sufficiently long time period has elapsed since the last failed access attempt to permit both count_1 and count_2 to be reset to zero (0), in step 303. Also, the system is returned to its primary state. As stated previously, $T_1$ is a relatively long time period, such as 120 hours.

If a negative result is obtained in step 301, a determination is made in step 305 as to whether the system is in its extended state, and if the value of DIFF is greater than $T_2$, which is a relatively short time period, such as 1 hour. A positive result indicates that a great deal of failed access attempts have not been made recently. Thus, count_2 is reset to zero in step 307, the system state is not changed, but rather remains in the extended state.

If a negative result is obtained in step 305, a determination is made in step 309 as to whether the system is in its lockout state, and if the value of DIFF is greater than the lockout time period, $T_L$, which may be a time period having a value between $T_1$ and $T_2$ such as 4 hours. A positive result indicates that the lockout interval has expired. When this happens, only count_2 is reset, and the system is returned to its extended state in step 311. This result is preferred, since, after lockout has occurred, a "graceful" return to the primary state can occur by first returning to the extended state, and, if few or no failed access attempts occur, thereafter returning to the primary state during future uses of the process of FIG. 3.

If a negative result is obtained in step 309, the process of FIG. 3 is terminated, with no changes having been made in count_1, count_2 or the system state.

While the previous description of FIG. 2 indicates that the update process of FIG. 3 is performed once (in step 202)

when any particular user requests access, it is to-be noted here that the process of FIG. 3 can also be performed periodically, (for example, on a predetermined time schedule), for one, several or all users at once. In that event, the value of DIFF is simply the difference between the time at which the process of FIG. 3 is performed and the time of the last failed access attempt made by each user.

If desired, the process of FIG. 3 can be somewhat simplified, as, for example, by eliminating steps 301 and 303 and by instead restoring the system to its primary state and resetting count_1 and count_2 on a periodic basis, such as at the end of every $T_1$ time units. This modification does not materially reduce the security of the system as long as $T_1$ is an integral multiple of $T_2$, that is, $T_1=nT_2$, where n is an integer; the more important aspects of the process, namely (1) that the system can re-enter the primary state only once in $T_1$ time units, and (2) that no more than $nC_2$ failed access attempts are allowed in $nT_2$ time units when the system is in its extended state, are maintained.

Referring now to FIG. 4, there is shown a typical format of records stored in database 127 of FIG. 1. Each line in FIG. 1 represents information associated with a particular user that may request access to resource 150, as identified by a unique user ID in column 401. Columns 402 and 403 contain primary and secondary access codes, respectively, for each user. As illustrated in FIG. 4, the primary code may contain 8 digits, and the secondary code may contain 4 digits. Instead of digits 0–9, it will be understood that letters a–z, symbols, or other indicia may be used as well. Column 404 contains a "time stamp" for each user, indicating the "time" at which the last failed access attempt was processed. In this context, "time" information includes not only the time of day, but also date information. This information is inserted in the record in steps 215 or 231 of FIG. 2. If no information is contained in this column, there are no such failed attempts for the user.

Columns 405 and 406 represent, for each user, the number of invalid access attempts using the primary and secondary codes. As described previously, these are the variables count_1 and count_2, respectively. Finally, in column 407, the system state for each user is indicated. The state may be primary, extended or lockout. Shorthand codes may of course by stored to indicate each different state, to save storage space.

Inspection of the typical records illustrated in FIG. 4 reveals that one user (the user with ID=100) may have more than one primary and secondary code assigned. Also, the lengths of the primary and secondary codes need not be the same for all users. In FIG. 4 user ID 575 has a longer secondary code providing for additional security. Assuming values of $C_1=2$ and $C_2=100$, user ID 100 is in the extended system state because count_1 is greater than 2. User ID 451 is in the lockout state because count_2 is greater than 100. The other users shown are in the primary state. Persons skilled in the art will appreciate that FIG. 4 is illustrative only of the nature of the information that is maintained for each user, and the manner in which the information may be formatted, and that many alternatives are possible.

A quantitative measure of the security provided by a conventional single code control system with lockout capability can be provided by computing the probability $\alpha$ of a hacker's success (HS) in obtaining access to the resource in at most C attempts before being locked out, and the expected time $\beta$ to break the code.

Assuming that a hacker knows the parameters of the system and follows the optimal strategy, these measures can be calculated as follows:

$$\alpha = Prob(HS \text{ in at most } C \text{ attempts}) \quad (1)$$
$$\approx 1 - \left(1 - \frac{M}{10^L}\right)^C$$

$$\beta \approx \frac{T}{\alpha} \quad (2)$$

In equations (1) and (2), the following notations are used:
(1) L is the length of the authorization code, i.e., the number of randomly assigned digits;
(2) C is the failure threshold, i.e., the number of failed access attempts before the user is locked out;
(3) T is the refresh time, i.e., the minimum time that needs to elapse without another failure before the count on the number of failed attempts generated by a particular user is reset to zero;
(4) $T_L$ is the lockout time i.e., the minimum time that needs to elapse without any attempts before the lockout functionality is disabled; and
(5) M is the number of authorization codes assigned to a particular user.

The security afforded by the present invention can be compared to that provided by a conventional single code system using equations (1) and (2). Consider an authorized user with 1000 access codes assigned, i.e., M=1000.

First, Using the conventional, single code approach, if each user is assigned a 14 digit access codes, of which 4 digits are predetermined and fixed and of which the remaining digits are random, then L=10. Assuming a threshold C=10, a refresh time of T=0.5 hours and a lockout time of $T_L=4$ hours, from equations (1) and (2) we get:

$\alpha \approx 0.000001$ and $\beta \approx 500,000$ hours.

By way of comparison, using the dual code approach contemplated by the present invention, let the primary and extended code lengths be $L_1=7$ and $L_2=11$, respectively. In this notation, the subscripts 1 and 2 refer to the primary and extended states, respectively. Assume a small threshold of $C_1=2$ for the primary code and a large threshold of $C_2=100$ for the extended (primary plus secondary) 11 digit code. In the dual code approach, the failure thresholds $C_1$ and $C_2$ are defined as the number of failed attempts before the user is put in the extended state, or locked out, respectively. In addition, let the refresh times for the primary and extended codes be $T_1=5$ days (120 hours) and $T_2=1$ hour, respectively. The refresh time for the primary code is long because the primary code length is small. As with the conventional approach, assume $T_L=4$ hours for the lockout time.

The degree of security for the primary and extended code, respectively, (distinguished by subscripts 1 and 2), also calculated using equations (1) and (2) is computed as follows:

For the Primary code: $\alpha_1 \approx 0.0002$ and $\beta_1 \approx 600,000$ hours
For the Extended code: $\alpha_2 \approx 0.000001$ and $\beta_2 \approx 1,000,000$ hours To recap, in this example, a user will be allowed 2 failed attempts on the smaller primary code every 120 hours. Starting from the third failed attempt in the same 120 hour period the user is not locked out but can gain access to the resource by using the extended code. The user is allowed 100 failed attempts per hour on the extended code. As seen by the results of equations (1) and (2), the dual code approach of the present invention provides better security than the conventional, single code scheme in terms of a 20% larger expected time to break the code. In addition, it allows more convenience with a smaller primary code most of the time, at the expense of a slightly more inconvenient extended code if the user makes mistakes.

If even greater security is desired, a primary and secondary code combination of 8 and 4 digits, respectively, can be used. This arrangement provides ten times the security of the 7 digit primary, 4 digit secondary code arrangement in the above example. A 10 digit primary, 4 digit secondary code arrangement provides a thousand times higher security. Thus, the dual code system can provide a way of significantly increasing the security level while still maintaining the convenience level most of the time.

Note that a thousand times higher security cannot realistically be achieved with the conventional single code approach. This is because equations (1) and (2) dictate that a 1000 fold improvement can only be achieved by the following options: (a) add three digits to a single code, (b) increase the refresh time a thousand times, (c) reduce the threshold level to a thousandth, or a combination of the three. The only practical option is (a), but a 13 digit single code is a bigger burden on the user than the (10,4) combination in the dual code approach, where the user needs to use the primary 10 digit code most of the time.

In summary, the dual code approach provides several advantages over the single code approach. It easily provides the desired level of security achieved by the single code scheme. A significantly higher level of security is attained with less inconvenience to the user. Most of the time, a user is able to access the system with less effort using only the primary code. The chance of a user being locked out and the resulting inconvenience and bad publicity is drastically reduced. The tradeoff for the convenience of not being locked out for a couple of hours is to remember a four digit secondary code. However, this inconvenience can be minimized by allowing the user to choose the code as one that is easy to remember for him or her. That would keep the secondary code similar to the "PIN" that most customers have for bank accounts etc., and would allow a user to have the same "PIN" for various purposes.

It is worth mentioning that the present invention is to be distinguished from a known approach used to provide computer security. Nowadays, networks of computers are quite common, and a two-level password system has evolved. First the user is asked to provide a network password; if correctly given, this gives the user access to the network, and provides only limited privileges, i.e., a restricted ability to use the network. Before using any system on the network, the user is asked for a second password for that system. Only then does the user have full use of the resources of that system. No lockout functionality is normally provided with such computer security arrangements.

The access control system of the present invention is well suited for use in conjunction with software defined networks (SDN), which are arrangements provided by telecommunications carriers such as AT&T which allow a subscriber (such as a large corporation) to use features and capabilities of the public telecommunications network as if the network were available only to employees and other users authorized by that subscriber. An SDN subscriber may originate a request to use the network from terminal equipment owned or controlled by the subscriber, or remotely through a feature known as Network Remote Access (NRA). One common NRA arrangement is to provide authorized users with a toll free (e.g. 800) number that may be called from any location, and an authorization code which may be presented in order to gain access to NRA features and capabilities.

In order to provide protection against access to SDN by hackers through trial and error strategies for guessing a valid authorization code, the present invention assigns to each user a primary and secondary authorization code. The number of failed authorization code attempts generated by any particular ANI through which a subscriber seeks access is monitored by the SDN network. If the number of unsuccessful attempts count_1 exceeds a first established failure threshold, $C_1$, then instead of blocking further access for a prespecified period of time, the present invention solicits the subscriber to enter both the primary and secondary codes. Only if the number of unsuccessful attempts count_2 exceeds a second established failure threshold, $C_2$, are all subsequent call attempts blocked. After the lockout period has elapsed the blocking functionality is disabled and the network resumes processing calls from the ANTI.

Various modifications and adaptations of the present invention may be made by those skilled in the art. Accordingly, it is intended that the invention be limited only by the appended claims. For example, extending this invention to more than two codes per user would lead to one primary state and several extended states (obtained by adding the secondary, tertiary, etc. code) before the lockout state is reached.

We claim:

1. A method of controlling access to a resource comprising the steps of:

permitting access to said resource by a user if said user
   a) in a given access attempt, enters all digits of a first multi-digit access code assigned to said user that matches a first predetermined access code stored for said user within a predetermined number of first attempts to match with said stored first predetermined access code, or
   b) subsequently in a given access attempt, enters all digits of a first and second multi-digit access code assigned to said user that matches a second predetermined access code stored for said user within a predetermined number of second attempts at matching entered digits to match entered digits with said stored second predetermined access code, and denying access to said resource if access is not permitted within said predetermined number of second attempts.

2. A method of controlling access to a resource by a user, including the steps of:

a) allowing said user to gain access to said resource if said user in a given access attempt, enters all digits of a first multi-digit access code assigned to said user that matches a first predetermined access code stored for said user within a predetermined number of first attempts to match with said stored first predetermined access code,
   b) upon failure of said user to gain access to said resource pursuant to step a), allowing said user to gain access to said resource if said user, in a given access attempt, enters all digits of a first and second multi-digit access code assigned to said user that matches a second predetermined access code assigned to said user within a fixed number of second attempts at matching entered digits to match entered digits with said stored second predetermined access code, and
   c) upon failure of said user to gain access to said resource pursuant to steps a) and b), denying access to said resource by said user for a predetermined period of time.

3. The method of claim 2 wherein in step b), said user is allowed access to said resource only if said user presents both said first and second access codes within said predetermined number of second attempts.

4. The method of claim 3 wherein said second access code is longer than said first access code.

5. An apparatus for restricting the use of a resource to authorized users, comprising:

(1) means for storing specific primary and secondary access codes to each authorized user, (2) means for allowing a user to access said resource by (a) correctly entering the specific primary access code assigned to said user without making more than a first threshold value $C_1$ incorrect entries of said specific primary access code in a time period $T_1$, or (b) if more than $C_1$ incorrect entries are made in said time period $T_1$, by then correctly entering both the specific primary access code and the specific secondary access code assigned to said user without making more than a second threshold value $C_2$ incorrect entries of said specific primary and secondary access codes in a time period $T_2$, and (3) means for blocking said user from further access for a predetermined time period if access is not allowed by said allowing means, even if said user thereafter correctly enters both said primary and secondary access codes during said predetermined time period.

6. The apparatus defined in claim 5 wherein $C_1 < C_2$ and $T_1 > T_2$.

7. An apparatus for controlling access to a resource comprising:

means for permitting access to said resource by a user if said user a) in a given access attempt, enters all digits of a first multi-digit access code assigned to said user that matches a first predetermined access code stored for said user within a predetermined number of first attempts to match with said stored first predetermined access code, or b) subsequently in a given access attempt, enters all digits of a first and second multi-digit access code assigned to said user that matches a second predetermined access code stored for said user within a predetermined number of second attempts at matching entered digits to match entered digits with said stored second predetermined access code, and means for denying access to said resource if access is not permitted within said predetermined number of second attempts.

8. Apparatus for controlling access to a resource by a user, including a) means for allowing said user to gain access to said resource if said user in a given access attempt, enters all digits of a first multi-digit access code assigned to said user that matches a first predetermined access code stored for said user within a predetermined number of first attempts, wherein said stored first predetermined access code is compared with said digits in each of said first attempts, b) means for allowing said user to gain access to said resource upon failure of said user to gain access to said resource by presenting said first fixed access code, if said user in a given access attempt, enters all digits of a first and second multi-digit access code assigned to said user that matches a second access code stored for said user within a predetermined number of second attempts, wherein said stored second predetermined access code is compared with said digits in each of said second attempts, and c) means for denying access to said resource by said user for a predetermined period of time upon failure of said user to gain access to said resource by presenting said second fixed access code.

9. The apparatus of claim 8 wherein said user is allowed access to said resource only if said user presents both said first and second access codes within said predetermined number of second attempts.

10. The apparatus of claim 9 wherein said second access code is longer than said first access code.

* * * * *